United States Patent

Gunderson et al.

[11] 3,919,884
[45] Nov. 18, 1975

[54] HORIZONTAL LOADING FIXTURE FOR SUSTAINED LOAD TESTING

[75] Inventors: Allan W. Gunderson, Xenia; Russell R. Cervay, Miamisburg, both of Ohio

[73] Assignee: The United States of America as represented by the Secretary of the Air Force, Washington, D.C.

[22] Filed: Apr. 17, 1974

[21] Appl. No.: 461,673

[52] U.S. Cl. .................................. 73/95
[51] Int. Cl.² ............................. G01N 3/08
[58] Field of Search ............... 73/95, 103, 91, 87

[56] References Cited
UNITED STATES PATENTS

| | | | |
|---|---|---|---|
| 3,170,322 | 2/1965 | Cavanaugh | 73/103 |
| 3,218,847 | 11/1965 | Starer et al. | 73/95 |
| 3,310,979 | 3/1967 | Hall | 73/95 |

OTHER PUBLICATIONS

High Speed Tensile Tester, Optron Corp. Publication, Feb. 1965, FIG. 3 used (p. 4).

*Primary Examiner*—Jerry W. Myracle
*Attorney, Agent, or Firm*—Joseph E. Rusz; Jacob N. Erlich

[57] ABSTRACT

A horizontal loading fixture for sustained load testing of a specimen having a system of lever arms and a tapered element through which a vertical tensile force on the tapered element produces a horizontal tensile load at the specimen. Because of this arrangement the gripping members for holding the specimen as well as any measurement equipment may be located outside the corrosive media surrounding the specimen tested.

8 Claims, 1 Drawing Figure

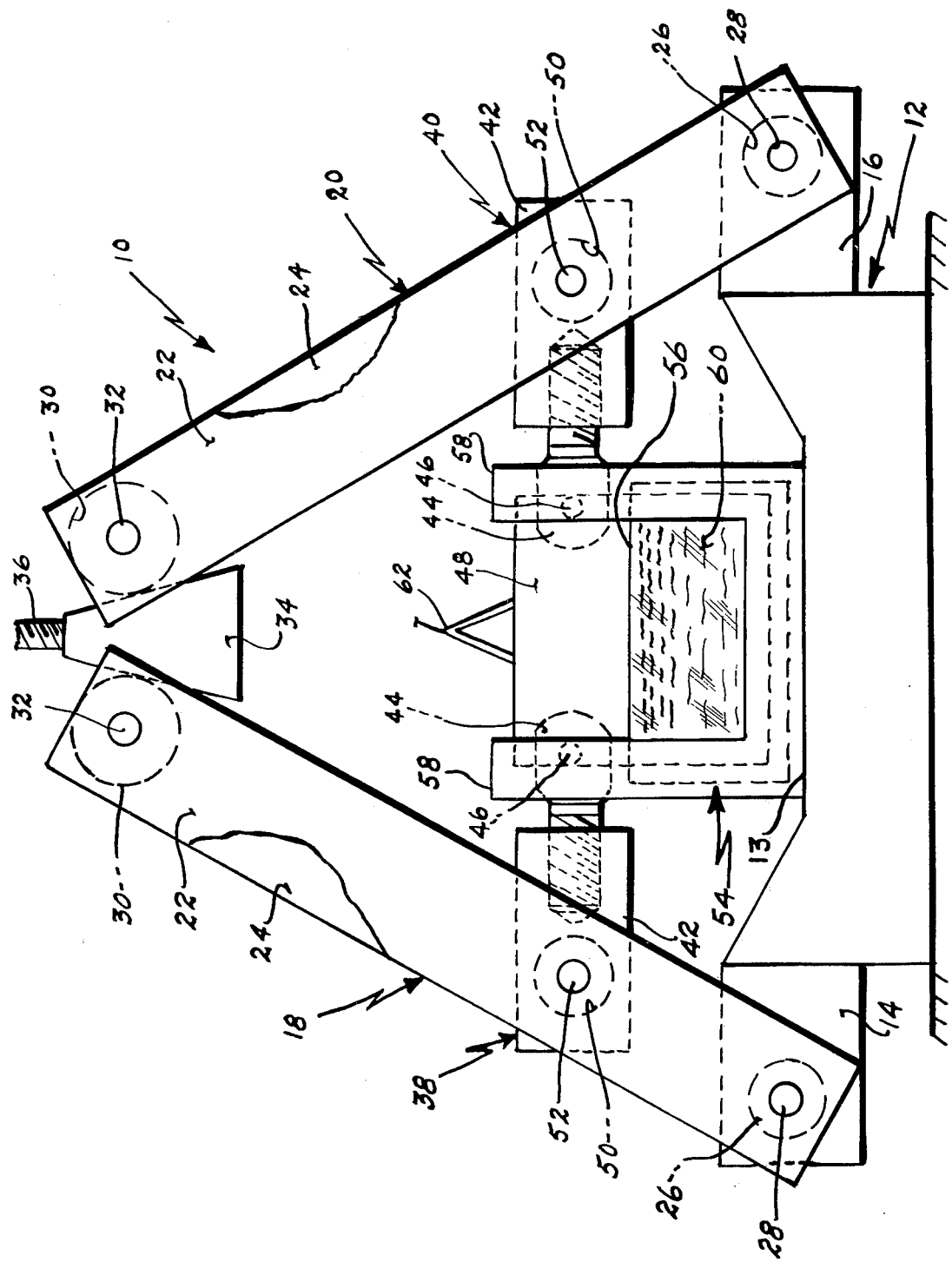

HORIZONTAL LOADING FIXTURE FOR SUSTAINED LOAD TESTING

BACKGROUND OF THE INVENTION

This invention relates generally to sustained load testing of material, and, more particularly to a horizontal loading fixture for sustained load testing. Stress corrosion cracking of a material is the result of an applied load and a surrounding environment which acts as a corrodent. Most structural materials are susceptable to stress corrosion cracking provided a high enough applied load (stress) is applied and a critical environment is available. Areas where stress corrosion cracking problems have arisen are in aircraft structures, bridge members and suspension cables, and large storage tank structures.

The prime factors affecting the stress corrosion cracking and subsequent time to failure are (1) materials properties, (2) stress intensity, (3) environment, (4) incubation time, (5) cyclic loadings, and (6) temperature.

The major specimen types for measuring the resistance of material to stress corrosion cracking have evolved from the specimens used in fracture mechanics studies. The specimens are precracked and then placed in an environment to which they may be susceptible and then a tensile load is applied. By proper instrumentation the incubation time to first crack advancement, the rate of crack advancement, and the time to failure of the specimen can be obtained.

Heretofore stress corrosion cracking tests of materials usually took place in the vertical position in a standard vertical creep test frame. With this arrangement three major problems were encountered:

1. The entire specimen tested had to be encased in order to contain the corrosive media in contact therewith;
2. The entire specimen as well as the measurement equipment utilized therewith were immersed in the corrosive media during the testing operation; and
3. As a result thereof dissimilar material galvanic coupling took place between the specimen and the specimen holding grips.

It, therefore, became essential that new test equipment be constructed which was capable of obtaining more reliable data on the stress corrosion cracking of materials.

SUMMARY OF THE INVENTION

The instant invention sets forth a horizontal loading fixture for sustained load testing of material which overcomes the problems set forth in detail hereinabove.

The test apparatus of this invention is basically a system of lever arms arranged in such a manner that a vertical force applied to the apparatus from a standard vertical force applying mechanism produces a horizontal load on the specimen tested. A tapered member attached to the vertical load applying mechanism through the linkage system provides a separating force on the lever arms. This separating force results in a horizontal tensile load being applied at the specimen location. Because of the shape of the specimen when a horizontal loading is used the container utilized to hold the corrosive media for the test operation need not completely encase the specimen. In addition, the specimen gripping mechanism need not be immersed in the corrosive media.

It is therefore an object of this invention to provide a loading fixture for sustained loading of a specimen in which the load is applied to the stress corrosion test specimen in the horizontal direction.

It is another object of this invention to provide a horizontal loading fixture for sustained load testing of a specimen which eliminates the galvanic coupling which could possibly take place between the test specimen and the specimen grips because of dissimilar metals.

It is another object of this invention to provide a horizontal loading fixture for sustained load testing of a specimen in which there is no need to use coatings to seal the liquid environment or to isolate the test material since only the specimen is in a test environment.

It is a further object of this invention to provide a horizontal loading fixture for sustained load testing of a specimen in which the crack orientation of the specimen is perpendicular to the loading, and gravity feeds the test environment into the crack as it grows through the test specimen.

It is a still further object of this invention to provide a horizontal loading fixture for sustained load testing of a specimen which is economical to produce and which utilizes conventional, currently available creep test frames adaptable to stress corrosion cracking tests.

For a better understanding of the present invention together with other and further objects thereof reference is now made to the following description taken in conjunction with the accompanying drawing and its scope will be pointed out in the appended claims.

DESCRIPTION OF THE DRAWING

The only FIGURE of the drawing is a side elevational view of the horizontal loading fixture of this invention shown partly in cross section.

DETAILED DESCRIPTION OF THE PREFERRED EMBODIMENT

Reference is now made to the only FIGURE of the drawing which shows a side elevational view of the horizontal loading fixture 10 of this invention. Loading fixture 10 is constructed of a base or support 12 fixedly secured in any conventional manner to the ground or the like. Support 12 has a flat upper surface 13 and a pair of extensions 14 and 16 protruding from each end thereof. A pair of side lever arms 18 and 20 are each pivotally secured at one end thereof to extending segments 14 and 16, respectively, of support 12. Lever arms 18 and 20 are of identical construction so that in future reference, wherever possible, only one such lever arm 18 will be referred to. In addition like elements of each lever arm will be given similar numerals for identification purposes.

Lever arm 18 is made up of a pair of plates 22 and 24 having extension 14 interposed therebetween. Any suitable bearing means such as roller bearings 26 allow for the almost frictionless movement of lever arm 18 while any suitable securing means such as bolt 28 pivotably secures lever arm 18 in place.

At the other end of lever arms 18 and 20, respectively, interposed between plates 22 and 24 of each arm is a roller member 30 held in a rotatable manner therebetween by any suitable securing means such as bolt 32. A tappered force applying member 34 is located between plates 22 and 24 of lever arms 18 and 20 and in abutting relationship with rollers 30. The top end of member 34 has an outstanding element 36 thereon which is attached to any conventional vertical force applying mechanism (not shown). As can be seen from the drawing any application of a vertical force to member 34 will cause the outward movement of levers 18 and 20.

Located at a suitable location between the two ends of lever arms 18 and 20, respectively, are a pair of identically constructed gripper mechanisms 38 and 40. Gripper mechanisms 38 and 40 are each in the form of an elongated body member 42 and suitable securing means 44. Securing means 44 in this invention takes the form of a flatened arm having one end mounted within body 42 and the other end having an aperture 46 therein for affixing to test specimen 48 in any conventional manner. Elongated body 42 of gripping mechanisms 38 and 40 are pivotally secured between plates 22 and 24 of each lever arm 18 and 20, respectively. This securement takes place by means of bearing element 50 and bolt 52 in a like fashion to the securement of lever arms 18 and 20 to extensions 14 and 16.

A specimen container 54 is mounted upon flat surface 13 of support 12. Container 54 may be made of any suitable non-corrosive material such as glass plates 56 held in positioned by bottom and side members 58. A corrosive media 60 as well as the test specimen 48 is located within container 54. It is an essential part of this invention that glass plate 56 of container 54 be of sufficient height to prevent the overflow of corrosive media 60 but not so high as to prevent the insertion of the securing means 44 of gripping mechanisms 38 and 40 into container 54. This arrangement allows for the securing means 44 to attach to specimen 48 outside the environment of the corrosive media 60. Although a particular container 54 is disclosed with this invention it should be noted that any suitable container which allows for the holding of a specimen and a corrosive media as well as for the insertion of the securing means 44 into the container but out of the corrosive media can be used with this invention. With this type of arrangement as set forth in the instant invention it is also possible to provide for measurement equipment such as strain guage displacement measurement device 62 to be located outside the corrosive media 60.

In operation, a vertical force applied to tapered member 34 will exert an outward force to lever arms 18 and 20 and thereby cause the subsequent horizontal load to test specimen 48 by means of gripping mechanisms 38 and 40. Because of this horizontal load application the entire specimen need not be encased and as a result thereof the gripping mechanism as well as any measurement equipment can be placed exterior of the corrosive media.

Although this invention has been described with reference to a particular embodiment, it will be understood to those skilled in the art that this invention is also capable of other embodiments within the spirit and scope of the appended claims.

We claim:

1. A horizontal loading fixture for sustained load testing of a specimen comprising a support member, a pair of lever arms, each of said lever arms being pivotally secured at one end thereof to said support member, means operably connected to the other end of each of said lever arms for moving said lever arms in a horizontal direction, means connected intermediate both ends of each of said lever arms for gripping said specimen and a container mounted on said support member surrounding said specimen and containing a preselected media therein, said gripping means protruding into said container but remaining outside of said preselected media whereby upon the application of a vertical force to said lever arm moving means a horizontal load is applied to said specimen.

2. A horizontal loading fixture for sustained load testing of a specimen as defined in claim 1 wherein said lever arm moving means is in the form of a tapered element.

3. A horizontal loading fixture for sustained load testing of a specimen as defined in claim 2 further comprising a roller mounted at said other end of each of said lever arms and said tapered element is in contact therewith.

4. A horizontal loading fixture for sustained load testing of a specimen as defined in claim 3 wherein each of said lever arms is made of a pair of plates held in spaced relationship with each other.

5. A horizontal loading fixture for sustained load testing of a specimen as defined in claim 4 wherein said roller is mounted between said plates in each of said lever arms.

6. A horizontal loading fixture for sustained load testing of a specimen as defined in claim 5 wherein said tapered element is positioned between said plates in each of said lever arms.

7. A horizontal loading fixture for sustained load testing of a specimen as defined in claim 6 wherein each of said gripping means is pivotally mounted on each of said lever arms, respectively.

8. A horizontal loading fixture for sustained load testing of a specimen as defined in claim 7 wherein said gripping means comprises an elongated body member and a specimen securing means attached thereto.

* * * * *